Figure 1:
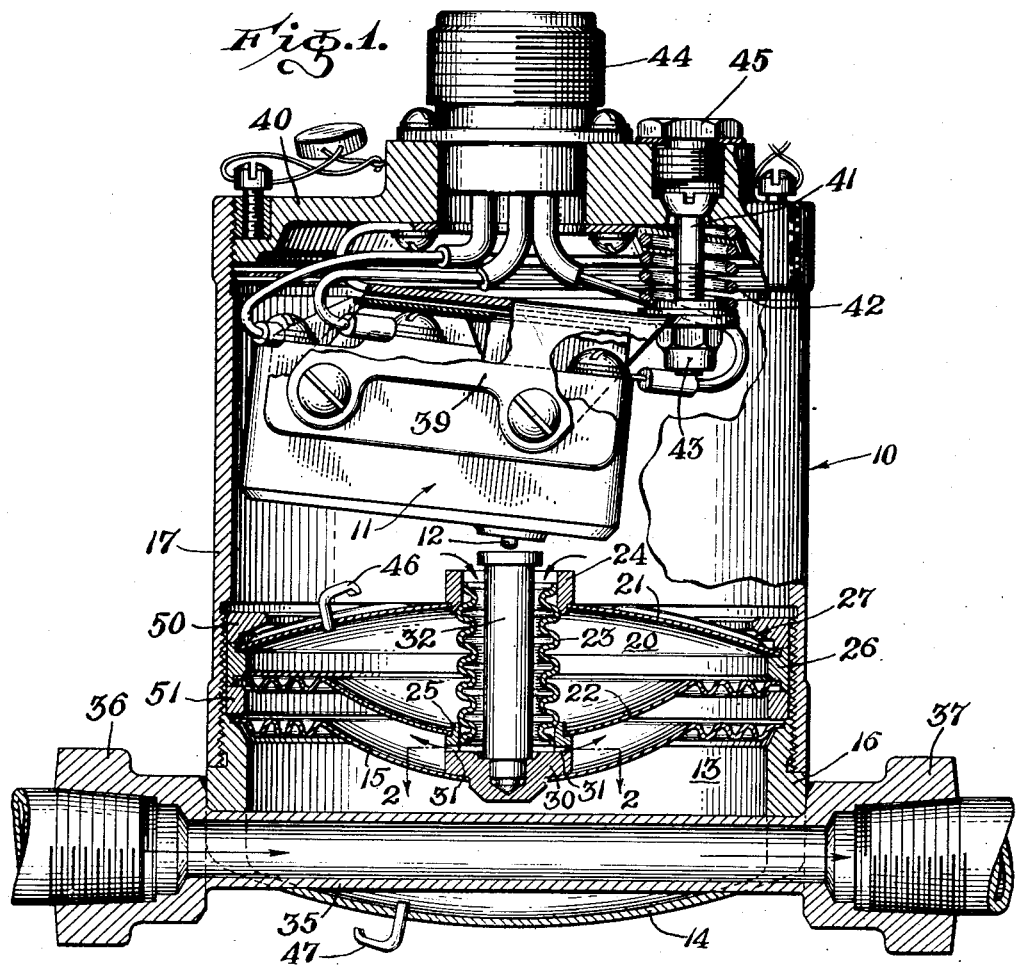

Aug. 11, 1953   G. A. STARBIRD   2,648,741
PRESSURE OPERATED TEMPERATURE RESPONSIVE SWITCH
Filed June 9, 1950

Inventor
George A. Starbird
BY
Fulwider & Mattingly
Attorneys.

Patented Aug. 11, 1953

2,648,741

UNITED STATES PATENT OFFICE

2,648,741

PRESSURE OPERATED TEMPERATURE RESPONSIVE SWITCH

George A. Starbird, Agoura, Calif., assignor to Meletron Corporation, Los Angeles, Calif., a corporation of California Application June 9, 1950, Serial No. 167,193

10 Claims. (Cl. 200—140)

My invention relates generally to electrical switch mechanisms and more particularly to devices of this type that are actuated by temperature changes, thereby producing a temperature responsive switch, the present form being operated by gas pressure, but having means compensating for changes in the ambient pressure.

It is often important that the temperature of fluid within a conduit or pipe be determined so that various controls may be operated to perform the process being carried out. If the fluid is one having a very low viscosity and a relatively high rate of flow, no particular difficulty is usually encountered in measuring or determining the temperature of the fluid by more or less conventional means. However, if the material is quite viscous, and particularly if its viscosity varies greatly with a small change in temperature, it is very difficult to obtain a true indication of the temperature of the fluid. For example, in the operation of aircraft at high altitudes, it is quite important that the temperature of the lubricating oil be maintained between limits in order that the proper viscosity, and consequently lubrication, is obtained. If a sensing probe is inserted into the stream of oil, the temperature of the probe itself may be slightly below that of the oil, and consequently the oil in the immediate vicinity of the probe is cooled and its viscosity is raised, thereby forming a coating on the probe that prevents the true temperature of the oil from being measured. Furthermore, unless there is a fairly high rate of flow within the conduit, the temperature of the sensing element, because of its greater mass and high specific heat, will largely determine the operation of the sensing means, rather than the temperature of the oil itself.

For these and similar reasons, the development of temperature responsive switches for such applications has encountered numerous difficulties, and where the safety of lives and property requires accurate measurement of temperatures, the problem has been a serious one.

With the foregoing in mind, it is therefore a major object of my invention to provide an improved temperature responsive switch that overcomes the difficulties of the general type enumerated.

Another object of my invention is to provide a temperature responsive switch of this character capable of accurate calibration, and one maintaining this calibration for an extended period of time once it has been set.

It is a further object of my invention to provide a switch of this type that may be simply and easily fabricated, without requiring excessive hand or precision work which materially adds to its cost.

Still another object of my invention is to provide a switch operating on simple and well-known principles and embodying readily available elements so that maintenance and service problems may be reduced to a minimum.

It is a still further object of my invention to provide a switch of this character that, by suitable minor changes in design, may be set to operate at high, low, or intermediate temperatures.

Figure 2:
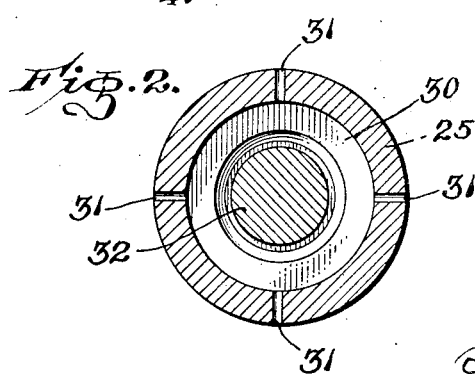

These and other objects and advantages of my invention will become apparent from the following description of a preferred form thereof, and from the drawings illustrating that form in which:

Fig. 1 is an axial cross-sectional view, partially broken away, of a switch constructed in accordance with my present invention; and Fig. 2 is a fragmentary view of the connection between the flexible diaphragm or wall members, taken on the line 2—2 of Fig. 1.

Considering first the general theory of operation of my improved switch, it will be recalled that as the temperature of a gas within a closed compartment is raised, the pressure exerted by that gas is likewise increased, in accordance with Charles' laws. However, the pressure exerted by the gas is usually measured by comparing this pressure to the pressure of the atmosphere surrounding the vessel within which the gas is contained. Thus, in a simple case, a generally rigid vessel having a single flexible wall will have that wall moved inwardly or outwardly as the pressure within the vessel is changed. However, it will be apparent that if the pressure within the vessel is increased, the wall can be held stationary by simultaneously increasing the pressure of the outside of the vessel so that the two remain in equilibrium. Similarly, the wall may be moved inwardly or outwardly as the pressure within the vessel remains substantially constant by increasing or decreasing the external pressure. Consequently, if the movement of the wall is to be used in determining the pressure within the vessel, some means for nullifying the effects of the external pressure must be provided.

One method of accomplishing this is to form the vessel into two compartments separated by a flexible wall or diaphragm, one of the compartments being sealed so that it is subjected to a constant pressure, while the other compartment contains a gas whose pressure varies to move or flex the diaphragm or flexible wall. However, the difficulties of providing two separate sealed compartments within a vessel, separated by a single flexible diaphragm or wall, and the problem of measuring or utilizing the movement of this flexible wall, prevent the use of such a device except in relatively delicate instruments generally unsuited for installation in aircraft. Nevertheless, I have evolved a construction making use of two separate compartments, one of which contains a gas at a substantially constant pressure, while the second contains a gas whose pressure varies. The two compartments are separated by what is, in effect, a single diaphragm, but which actually comprises two separate spaced diaphragms, both of which are subjected to the pressure of the ambient air. The two diaphragms are mechanically connected together so that any change in this atmospheric pressure tends to move the diaphragms in opposite directions, the result being that the diaphragms remain stationary as the atmospheric pressure changes, but move in response to pressure changes within the second chamber.

The preferred embodiment of my device incorporating these features is shown in Fig. 1 of the drawings in which the numeral 10 indicates generally a housing enclosing an electric switch 11, preferably of the miniature snap-acting variety, provided with an operating lever or button 12. Also within the housing 10 is a chamber 13, formed between one end 14 of the housing and a flexible diaphragm 15 that is sealed to the side walls 16 formed as a continuation of the end 14. For ease in construction and maintenance, the side walls 16 are preferably separable from side walls 17 forming the remainder of the housing 10, and consequently the chamber 13 may be removed from the remainder of the housing without disturbing the latter or the switch 11.

Also within the housing 10 is a second chamber 20 having a rigid wall 21 and a flexible wall or diaphragm 22. The chamber 20 is evacuated, and is provided with a bellows 23 extending axially through the chamber, from the rigid wall 21, to the flexible diaphragm 22. The bellows 23 is open at each end so that an axially extending passageway, through the interior of the bellows, is provided through the chamber 20. The exterior of the bellows 23 is brazed or otherwise sealingly connected to a boss 24 mounted on the rigid wall 21, while the opposite end of the bellows is sealed to a boss or ring 25 connected to the flexible diaphragm 22. The outer edges of the rigid wall 21 and the flexible diaphragm 22 are anchored and sealed to a ring 26, and thus the complete assembly of rigid wall, flexible diaphragm, bellows 23, and ring 26 forms a sub-assembly hereinafter referred to as aneroid capsule 27.

As indicated in Fig. 1, the aneroid capsule 27 is placed within the housing 10 with the flexible diaphragm 22 adjacent the flexible wall 15 of the chamber 13 but spaced a slight distance therefrom, while the rigid wall 21 is on the opposite side of the capsule. A button 30, aligned with the ring 25 is mounted on the flexible wall 15 and bears against the ring so that the two move as a unit. Ports 31 extend radially outwardly from the axial passageway through the bellows 23, these ports preferably being formed in the ring 25 as indicated in Fig. 2, but alternatively being formed in the button 30. In this way, the pressure within the housing 10 is transmitted through the interior of the bellows 23 to the space between the flexible diaphragm 22 and the flexible wall 15. Normally, the flexible diaphragm 22 and the flexible wall 15 are pre-stressed so that the ring 25 bears against the button 30 under all conditions of pressure and temperature that may be encountered during the operation of the device. However, if it appears there may be some possibility that the ring 25 and button 30 will be separated from each other, the two members may be held together by a suitable screw-thread connection as will be apparent to those skilled in the art.

Mounted upon the button 30 is a pin or plunger 32 that extends axially through the bellows 23 to project above the boss 24 and to bear against the operating button 12 of the switch 11. The pin 32 is firmly anchored to the button 30 so that all movement of the flexible wall 15 is transferred to the plunger to produce the proper operation of the switch 11.

Passing through the chamber 13 is a conduit 35 containing the fluid whose temperature is to be measured. As clearly shown, the conduit 35 passes completely through the chamber 13, the walls 14 and 16 thereof being sealed to the conduit so that the chamber is pressure tight. Coupling members 36 and 37 are formed on opposite ends of the conduit 35, these coupling members forming a convenient means for connecting the temperature-responsive switch into the fluid line. The walls of the conduit 35 are formed of metal, and are surrounded on all sides by the chamber 13 so that the temperature of the fluid in the conduit is quickly transmitted to the interior of the chamber.

To complete the assembly, the switch 11 is mounted upon a bracket 39, one end of which is anchored to an end wall 40 of the housing 10, while the other end of the bracket is pierced to receive a screw 41. A spring 42 extends between the end wall 40 and the pierced end of the bracket 39, while a nut 43, mounted on the end of the screw 41, is held by the bracket against rotation. Thus, by turning the screw 41, the pierced end of the bracket 39 is moved toward or away from the end wall 40. In this manner, the switch 11 is adjustably mounted within the housing, and the position of the operating button 12 thereof may be adjusted with respect to the plunger 32. Finally, a suitable electrical connector 44, preferably of the so-called AN type is mounted on the end wall 40 and a cap screw 45 is placed over the adjusting screw 41.

In the manufacture of my improved switch, the aneroid capsule 27 is formed by assembling the rigid wall 21, flexible diaphragm 22, bellows 23, and ring 26 in the manner previously indicated, these members being brazed or otherwise connected together to form a pressure-tight member. A capillary connection 46 is passed through the fixed wall 21, and the interior of the aneroid capsule 27 is evacuated, whereupon the capillary connection is sealed.

In a generally similar manner, the end of the housing 10 containing the chamber 13 has the conduit 35 passed through it, the conduit being sealed so that the chamber 13 cannot leak around the conduit, nor can the conduit leak into the chamber. The flexible wall 15 having the button 30 mounted thereon is then placed on the upper end of the wall 16 and sealed thereto, the chamber 13 thus being pressure tight and sealed from the atmosphere, as well as sealed from the conduit 35. A capillary connection 47 passes through the end wall 14, and the chamber 13 may be evacuated, pressurized, or partially filled with a volatile liquid. The procedure followed in any particular case, it will be understood, will be determined largely by the anticipated range of temperature encountered and also the particular points within this range at which operation of the switch 11 is to occur. It will be realized that the greater the initial pressure within the chamber 13, the greater the pressure change will be, measured in pounds per square inch or other convenient units, for a given change in temperature. Consequently, if the switch assembly is to be operated within a narrow range of temperatures, a greater initial pressure would normally be desirable within the chamber 13, while if the device is to operate over a fairly wide range, the initial pressure within the pressure would normally be much smaller. In this connection, it must be remembered that if the switch is to be subjected to high temperatures, the pressure within the chamber 13 will become quite high, and consequently the walls of the chamber must be built to withstand this pressure.

At times, it is possible to select a material that boils or vaporizes within the temperature range at which the switch is to operate. For example, if the switch 11 were to be operated at a temperature of approximately 57° C., a slight amount of acetone might be placed within the chamber 13. Under a pressure of 76 cm. of mercury, acetone has a boiling point of 57° C. Consequently, when this temperature is reached, the acetone will start to vaporize, and this will greatly increase the pressure within the chamber 13, even though the temperature therein increases only slightly. By varying the initial pressure within the chamber 13, the boiling point may be raised or lowered, and by using appropriate materials, a wide range of pressures may be selected. For example, acetylene has a boiling point of −72° C., while glycerine has a boiling point of 291° C. However, the use of a material that is normally in a liquid or solid phase within the container 13 but which vaporizes at a predetermined temperature, is usually not necessary unless extremely accurate calibration of the switch assembly is necessary.

In assembling the complete structure, a clamping ring 50 is threadedly fitted within the walls 17 of the housing 10, and the aneroid capsule 27, with the rigid wall 21 adjacent the ring 50, is inserted to bear against the ring. A spacing ring 51 is next inserted in the housing 10, and finally the end of the housing containing the chamber 13 is screwed into the housing with the side walls 16 threadedly engaging the side walls 17 of the housing, the chambers 13 and 20 and the flexible wall 15 and diaphragm 22 thus being firmly held in proper alignment. Thereafter, the plunger 32 is inserted through the bellows 23 if this has not previously been done, the plunger being firmly held to the button 30 by welding, brazing, a snap ring, or other suitable means. The opposite end of the housing 10, carrying the switch 11 and its associating equipment, is threadedly mounted within the housing in the position shown, and locked in place by suitable screws. The completed device is then ready for testing and calibration, the latter being done by adjusting the screw 41.

In operation, the fluid whose temperature is to be determined flows through the conduit 35, and the heat of that fluid is transmitted through the walls of the conduit to the material within the chamber 13. Assuming that the temperature of the fluid is considerably below a normal room temperature, the gas or vapor within the chamber 13 will be cooled, and the pressure exerted by it against the flexible wall 15 will be decreased. Assuming that the pressure within the housing 10 remains constant, the flexible wall 15 will be moved inwardly, away from the switch 11, carrying with it the plunger 32, and decreasing the pressure on the operating lever 12 of the switch so that the latter is operated. At the same time, the flexible diaphragm 22 of the aneroid capsule 27 moves with the flexible wall 15 because of the pre-stressing of the diaphragm, as previously mentioned. It will be noted that this pre-stressing may be accomplished by the particular manner in which the diaphragm 22 is shaped, or by making the bellows 23 of a resilient construction, in which case they act as a spring, or by a combination of shaping the diaphragm and by the resilient construction of the bellows.

If the pressure within the housing 10 is decreased, the pre-stressing of the diaphragm 22 will tend to cause the diaphragm to move away from the switch 11, but at the same time, the flexible wall 15 tends to move toward the switch. The area of the flexible wall 15 is substantially equal to the area of the flexible diaphragm 22, and the two areas may be made exactly equal if this is important. Consequently, the increased force exerted by the diaphragm 22 is exactly opposed and counterbalanced by the increased force exerted by the flexible wall 15. Therefore, no movement of the plunger 32 occurs because of a change in atmospheric pressure alone. Likewise, as the atmospheric pressure is increased, this pressure is transmitted through the bellows 23 and the ports 31 so that the flexible wall 15 tends to move away from the switch 11, while the flexible diaphragm 22 tends to move towards the switch. However, because of the prestressing, there is again no movement of the button 30 and plunger 32, and consequently there is again no operation of the switch because of a pressure change. Incidentally, it will be appreciated that in the normal operation of my switch as it is applied to high altitude aircraft, the conditions of low temperature and low atmospheric pressure are the standard operating conditions.

As the temperature of the fluid passing through the conduit 35 is increased, the gas within the chamber 13 is likewise increased and exerts a greater pressure upon the flexible wall 15. With no change in atmospheric pressure, the increased force exerted by the flexible wall 15 is unopposed by a correspondingly increased force exerted by the flexible diaphragm 22, and consequently the button 30 and the plunger 32 are moved toward the switch 11, thereby moving the operating lever 12 thereof and actuating the switch. Under these conditions, it can be shown that changes in atmospheric pressure do not affect the movement of the plunger 32, and consequently I have produced a switch making use of the heat expansive properties of gases, which is unaffected by the pressure of the surrounding atmosphere.

The calibration of the switch assembly is secured by passing a fluid of the desired temperature through the conduit 35, and then adjusting the screw 41 until the switch 11 is located so that the operating lever 12 thereof is in the desired position. For example, if the low temperature operating point of the assembly is to be set, the screw 41 is turned so that the switch 11 is pivoted upwardly, away from the plunger 32, until the operating lever 12 of the switch moves an amount just sufficient to open or close the desired circuit within the switch. A further decrease in temperature will have no additional effect upon the switch 11, since its lower operating point has already been reached. However, upon an increase in temperature of the fluid within the conduit 35, the plunger 32 will be moved toward the switch 11, and will move the operating lever 12 to reverse the action previously occurring, and possibly to open or close an additional circuit. The opening or closing of a given circuit within the switch 11 may be controlled by the selection of the switch itself, since a wide variety of switch contact combinations are available in miniature snap-acting switches of this type. When calibration and adjustment is complete, the cap screw 45 is inserted and sealed, and the device is ready for operation.

From the foregoing, it will be seen that I have provided a switch fully capable of securing the objects and advantages heretofore set forth. It will be apparent that changes may be made in the construction of a switch by those skilled in the art without departing from the broad concept of my invention, and consequently I do not wish to be restricted to the particular form or arrangement of parts herein described and shown except as limited by my claims.

I claim:

1. A switch of the type described which includes: a first chamber having a movable wall, said chamber being evacuated and sealed; a second chamber having a movable wall, said second chamber being sealed, and having gas therein; a heat exchanger means within said second chamber for changing the temperature and thereby varying the pressure of said gas therein; mounting means supporting said first chamber and said second chamber generally adjacent each other so that both are subjected to the same ambient pressure; connecting means mechanically coupling said movable walls of said first and second chambers, respectively, so that the forces exerted by said walls oppose and counteract each other when the ambient pressure acting upon said chambers is changed; and switch means mechanically connected to at least one of said movable walls for operation by the movement of said wall in response to variation of the pressure of the gas within said second chamber.

2. A switch of the type described which includes: a first chamber having a movable wall, said chamber being evacuated and sealed; a second chamber having a movable wall, said second chamber being sealed, and having gas therein; a heat exchanger means within said second chamber for changing the temperature and thereby varying the pressure of said gas therein; mounting means supporting said first and second chambers with their respective movable walls adjacent to each other, said chambers being so positioned that said movable walls tend to move apart when the ambient pressure is increased, and tend to move together when the ambient pressure is decreased; connecting means mechanically coupling said movable walls of said first and second chambers, respectively, so that the forces exerted by said walls oppose and counteract each other when the ambient pressure acting upon said chambers is changed; a switch operator extending through one of said chambers, attached to said connecting means for transmitting the motion thereof; and switch means adjacent said switch operator and engaged thereby for operation by the movement of said switch operator in response to variation of the pressure of the gas within said second chamber.

3. A switch of the type described which includes: a first chamber having a movable wall, said chamber being evacuated and sealed, and said movable wall being resiliently urged outwardly from said chamber, against the ambient pressure acting thereon; a second chamber having a movable wall, said second chamber being sealed, and having gas therein; means sealed within said second chamber for varying the pressure of said gas therein; mounting means supporting said first and second chambers with their respective movable walls adjacent to each other, said chambers being so positioned that said movable walls tend to move apart when the ambient pressure is increased, and tend to move together when the ambient pressure is decreased; connecting means mechanically coupling said movable walls of said first and second chambers, respectively, so that the forces exerted by said walls oppose and counteract each other when the ambient pressure acting upon said chambers is changed; a switch operator extending through one of said chambers, attached to said connecting means for transmitting the motion thereof; and switch means adjacent said switch operator and engaged thereby for operation by the movement of said switch operator in response to variation of the pressure of the gas within said second chamber.

4. A switch of the type described which includes: a first chamber having a movable wall, said chamber being evacuated and sealed, and said movable wall being resiliently urged outwardly from said chamber, against the ambient pressure acting thereon; a second chamber having a movable wall, said second chamber being sealed, and having gas therein; a flexible bellows extending through one of said chambers from the movable wall to the other side thereof, said bellows being sealed to the chamber containing it while its ends are open to provide a passageway subjected to ambient pressure through said bellows-containing chamber; means within said second chamber for varying the pressure of said gas therein; mounting means supporting said first and second chambers with their respective movable walls adjacent to each other, said chambers being so positioned that said movable walls tend to move apart when the ambient pressure is increased, and tend to move together when the ambient pressure is decreased; connecting means mechanically coupling said movable walls of said first and second chambers, respectively, so that the forces exerted by said walls oppose and counteract each other when the ambient pressure acting upon said chambers is changed; switch operating means connected to at least one of said movable walls for movement thereby, said switch operating means extending through said flexible bellows to a point remote from said movable walls; and switch means supported by said mounting means and having an operating member engaged by said switch operating member to actuate said switch means in response to variation of the pressure of the gas within said second chamber.

5. A switch of the type described which includes: a first chamber having a movable wall, said chamber being evacuated and sealed, and said movable wall being resiliently urged outwardly from said chamber, against the ambient pressure acting thereon; a second chamber having a movable wall, said second chamber being sealed, and having gas therein; a conduit for carrying a fluid whose temperature is to be measured, passing through said second chamber, but sealed therefrom to prevent the passage of fluid between said conduit and said chamber, the temperature of said fluid being transmitted through the walls of said conduit to said gas within said second chamber to control the pressure of said gas; mounting means supporting said first and second chambers with their respective movable walls adjacent to each other, said chambers being so positioned that said movable walls tend to move apart when the ambient pressure is increased, and tend to move together when the ambient pressure is decreased; connecting means mechanically coupling said movable walls of said first and second chambers, respectively, so that the forces exerted by said walls oppose and counteract each other when the ambient pressure acting upon said chambers is changed; and switch means mechanically connected to at least one of said movable walls for operation by the movement of said wall in response to variation of the pressure of the gas within said second chamber.

6. A switch of the type described which includes: a first chamber having a movable wall, said chamber being evacuated and sealed, and said movable wall being resiliently urged outwardly from said chamber, against the ambient pressure acting thereon; a second chamber having a movable wall, said second chamber being sealed, and having gas therein; a flexible bellows extending through one of said chambers from the movable wall to the other side thereof, said bellows being sealed to the chamber containing it while its ends are open to provide a passageway subjected to ambient pressure through said bellows-containing chamber; a conduit for carrying a fluid whose temperature is to be measured, passing through said second chamber, but sealed therefrom to prevent the passage of fluid between said conduit and said chamber, the temperature of said fluid being transmitted through the walls of said conduit to said gas within said second chamber to control the pressure of said gas; mounting means supporting said first and second chambers with their respective movable walls adjacent to each other, said chambers being so positioned that said movable walls tend to move apart when the ambient pressure is increased, and tend to move together when the ambient pressure is decreased; connecting means mechanically coupling said movable walls of said first and second chambers, respectively, so that the forces exerted by said walls oppose and counteract each other when the ambient pressure acting upon said chambers is changed; switch operating means connected to at least one of said movable walls for movement thereby, said switch operating means extending through said flexible bellows to a point remote from said movable walls; and switch means supported by said mounting means and having an operating member engaged by said switch operating member to actuate said switch means in response to variation of the pressure of the gas within said second chamber.

7. A switch of the type described which includes: a first chamber having a movable wall, said chamber being evacuated and sealed, and said movable wall being resiliently urged outwardly from said chamber, against the ambient pressure acting thereon; a second chamber having a movable wall, said second chamber being sealed, and having gas therein; a flexible bellows extending through one of said chambers from the movable wall to the other side thereof, said bellows being sealed to the chamber containing it while its ends are open to provide a passageway subjected to ambient pressure through said bellows-containing chamber; an inflexible member mounted on said movable wall of said second chamber, and a cooperating inflexible member mounted on said movable wall of said first chamber, said flexible bellows extending to at least one of said members, with a port extending from the passageway formed by said bellows to the exterior of said members; means connected to said second chamber for varying the pressure of said gas therein; mounting means supporting said first and second chambers with their respective movable walls adjacent to each other, said chambers being so positioned that said movable walls tend to move apart when the ambient pressure is increased, and tend to move together when the ambient pressure is decreased; connecting means mechanically coupling said movable walls of said first and second chambers, respectively, so that the forces exerted by said walls oppose and counteract each other when the ambient pressure acting upon said chambers is changed; and switch means mechanically connected to at least one of said movable walls for operation by the movement of said wall in response to variation of the pressure of the gas within said second chamber.

8. A switch of the type described which includes: a first chamber having a movable wall, said chamber being evacuated and sealed, and said movable wall being resiliently urged outwardly from said chamber, against the ambient pressure acting thereon; a second chamber having a movable wall, said second chamber being sealed, and having gas therein; a flexible bellows extending through one of said chambers from the movable wall to the other side thereof, said bellows being sealed to the chamber containing it while its ends are open to provide a passageway subjected to ambient pressure through said bellows-containing chamber; an inflexible member mounted on said movable wall of said second chamber, and a cooperating inflexible member mounted on said movable wall of said first chamber, said flexible bellows extending to at least one of said members, with a port extending from the passageway formed by said bellows to the exterior of said members; a conduit for carrying a fluid whose temperature is to be measured, passing through said second chamber, but sealed therefrom to prevent the passage of fluid between said conduit and said chamber, the temperature of said fluid being transmitted through the walls of said conduit to said gas within said second chamber to control the pressure of said gas; mounting means supporting said first and second chambers with their respective movable walls adjacent to each other, said chambers being so positioned that said movable walls tend to move apart when the ambient pressure is increased, and tend to move together when the ambient pressure is decreased; connecting means mechanically coupling said movable walls of said first and second chambers, respectively, so that the forces exerted by said walls oppose and counteract each other when the ambient pressure acting upon said chambers is changed; switch operating means connected to at least one of said movable walls for movement thereby, said switch operating means extending through said flexible bellows to a point remote from said movable walls; and switch means supported by said mounting means and having an operating member engaged by said switch operating member to actuate said switch means in response to variation of the pressure of the gas within said second chamber.

9. A temperature responsive switch of the class described which includes: a housing; a first chamber mounted in said housing, said chamber comprising a rigid wall and a flexible wall connected together to form a sealed compartment, said first chamber being evacuated; a flexible bellows-like member extending through said first chamber from said flexible wall to the other side of said first chamber, said member having its ends open while being sealed to said first chamber to provide a passageway through said first chamber while retaining the evacuation thereof, said flexible wall being resiliently urged outwardly against the external pressure exerted on said first chamber; a second chamber mounted in said housing adjacent said first chamber, comprising a rigid wall and a flexible wall connected together to form a sealed compartment, said second chamber containing a gas, and having its flexible wall adjacent the flexible wall of said first chamber but spaced therefrom, the areas of said flexible walls of said first and second chambers being substantially equal; an inflexible member mounted on said flexible wall of said first chamber for movement therewith, adjacent said bellows-like member, and a cooperating inflexible member mounted on said flexible wall of said second chamber for movement therewith, said members being held together for movement as a single unit, at least one of said members having a port therein connecting said passageway through said bellows-like member to the space between said flexible walls; a conduit within said second chamber for carrying a fluid whose temperature is to be measured, said conduit being sealed from said chamber to prevent the passage of any fluid between said conduit and said chamber, the temperature of the fluid whose temperature is to be measured being transmitted through the wall of said conduit to said gas within said second chamber to control the pressure thereof; a plunger extending through said bellows-like member and connected to at least one of said inflexible members for movement therewith, said plunger moving axially in response to a variation in the pressure within said second chamber, but remaining stationary when the ambient pressure acting upon said flexible walls is the sole variable; switch means mounted in said housing, having an operating member adjacent the end of said plunger remote from said inflexible members, said switch means opening and closing contacts in response to the axial movement of said plunger; and adjustment means for controlling the position of said switch means with respect to said plunger, whereby the temperature setting of said switch may be varied.

10. A switch as described in claim 9 in which said second chamber has a material therein that changes from a non-gaseous to a gaseous phase at a temperature substantially equal to the temperature at which said switch means is to be operated.

GEORGE A. STARBIRD.

References Cited in the file of this patent
UNITED STATES PATENTS

| Number | Name | Date |
|---|---|---|
| 1,817,634 | McCabe | Aug. 4, 1931 |
| 2,120,938 | Kronmiller | June 14, 1938 |
| 2,376,144 | Levine | May 15, 1945 |
| 2,489,419 | Kerfoot | Nov. 29, 1949 |